(12) United States Patent
Marcotte (10) Patent No.: US 10,641,680 B2
(45) Date of Patent: *May 5, 2020

(54) SYSTEM FOR CALIBRATING VIBRATIONS IN THE CONTEXT OF SIMULATION

(71) Applicant: CAE INC., Saint-Laurent (CA)

(72) Inventor: Nicolas Marcotte, Saint-Laurent (CA)

(73) Assignee: CAE INC., Saint-Laurent, Quebec (CA)

( * ) Notice: Subject to any disclaimer, the term of this patent is extended or adjusted under 35 U.S.C. 154(b) by 310 days.

This patent is subject to a terminal disclaimer.

(21) Appl. No.: 15/475,207

(22) Filed: Mar. 31, 2017

(65) Prior Publication Data

US 2018/0283982 A1  Oct. 4, 2018

(30) Foreign Application Priority Data

Mar. 31, 2017 (CA) .................................. 2962838

(51) Int. Cl.
  *G01M 7/02* (2006.01)
  *G09B 9/16* (2006.01)
  *G09B 9/12* (2006.01)

(52) U.S. Cl.
  CPC .............. *G01M 7/025* (2013.01); *G09B 9/12* (2013.01); *G09B 9/16* (2013.01)

(58) Field of Classification Search
  CPC ............ G09B 9/12; G09B 9/16; G01M 7/025
  USPC .......................................................... 367/13
  See application file for complete search history.

(56) References Cited

U.S. PATENT DOCUMENTS

| | | | |
|---|---|---|---|
| 3,845,572 A | 11/1974 | McCanney | |
| 4,350,489 A | 9/1982 | Gdovin | |
| 4,781,594 A | 11/1988 | Metcalf | |
| 5,616,030 A | 4/1997 | Watson | |
| 5,627,311 A | 5/1997 | Nakaya et al. | |
| 6,739,424 B2 | 5/2004 | Ogura et al. | |
| 8,340,327 B2 | 12/2012 | Snider et al. | |
| 9,058,750 B2 | 6/2015 | Bohlender | |
| 9,200,944 B2 | 12/2015 | Sivonen et al. | |
| 2002/0021283 A1 | 2/2002 | Rosenberg et al. | |
| 2008/0164377 A1 | 7/2008 | Lautridou et al. | |
| 2011/0127380 A1* | 6/2011 | Orgerie .............. | B64D 11/0015 244/118.5 |

(Continued)

OTHER PUBLICATIONS

"Acoustics," Wikipedia, 2016, downloaded Mar. 13, 2019 from https://en.wikipedia.org/w/index.php?title=Refraction&oldid=710974747, 7 pages. (Year: 2016).*

(Continued)

*Primary Examiner* — Daniel L Murphy
(74) *Attorney, Agent, or Firm* — Fasken Martineau Dumoulin LLP (57) ABSTRACT

The present system and simulation environment calibrate vibrations. The system and simulation environment comprise a synthesizer for generating an electrical signal and a transducer for converting the electrical signal into vibrations propagated through a physical component and refracted in a physical space of the simulation environment. The system also comprises a vibration sensor measuring the vibrations propagated in the physical component. The system further comprises a configurator for calibrating the electrical signal generated by the synthesizer based on a vibration target for a simulated event and vibrations measured by the vibration sensor.

14 Claims, 10 Drawing Sheets

(56) References Cited

U.S. PATENT DOCUMENTS

2012/0106748 A1    5/2012  Peachey et al.
2016/0093230 A1    3/2016  Boggs et al.

OTHER PUBLICATIONS

"Conductivity," Cambridge English disctionary 2019, downloaded Mar. 17, 2019 from https://dictionary.cambridge.org/us/dictionary/english/conductivity, 6 pages. (Year: 2019).*

"Frequency response," Wikipedia 2019, downloaded Mar. 17, 2019 from https://en.wikipedia.org/wiki/Frequency_response, 5 pages. (Year: 2019).*

"Permeability," Merriam-Webster 2019, downloaded Mar. 17, 2019 from https://www.merriam-webster.com/dictionary/permeability, 9 pages. (Year: 2019).*

"Permittivity," Merriam-Webster 2019, downloaded Mar. 17, 2019 from https://www.merriam-webster.com/dictionary/permittivity, 7 pages. (Year: 2019).*

* cited by examiner

SYSTEM FOR CALIBRATING VIBRATIONS IN THE CONTEXT OF SIMULATION

TECHNICAL FIELD

The present disclosure relates to the field of simulation. More specifically, the present disclosure relates to a system for calibrating vibrations in the context of simulation.

BACKGROUND

To render a simulation more realistic, vibrations generated during operating conditions are recreated by a simulation environment as simulated vibrations. The simulated vibrations reproduce vibrations occurring during the operating conditions, such as for example the impact of rain or air on the cockpit of an aircraft.

A simulated vibration is typically generated by a transducer converting an electrical signal into the corresponding simulated vibration transmitted in the simulator. A library of model electrical signals is used for controlling the transducer, each model electrical signal allowing the reproduction by the transducer of a simulated vibration corresponding to a unique phenomenon (e.g., impact of rain, impact of air, etc.).

Several transducers are generally used simultaneously, to transmit a plurality of simulated vibrations at different locations of the simulator.

However, current library of model electrical signals do not take into account the presence of the plurality of transducers and the inherent vibration of components of the simulator during simulation.

There is therefore a need for a new system for calibrating vibrations generated in a simulation environment.

SUMMARY

According to a first aspect, the present disclosure provides a system for calibrating vibrations in a simulation environment. The system comprises a synthesizer for generating an electrical signal and a transducer for converting the electrical signal into vibrations propagated through a physical component of the simulation environment and refracted in a physical space of the simulation environment. The system also comprises a vibration sensor measuring the vibrations propagated in the physical component. The system further comprises a configurator for calibrating the electrical signal generated by the synthesizer based on a vibration target for a simulated event in the simulation environment and vibrations measured by the vibration sensor.

According to another aspect, the present disclosure provides a simulation environment with vibration calibrating functionality. The simulation environment comprises a plurality of physical components defining a physical space. system for calibrating vibrations in a simulation environment. The simulation environment also comprises a plurality of synthesizers, each synthesizer corresponding to an independent channel and each synthesizer generating an electrical signal. The simulation environment further comprises a plurality of transducers, where each transducer is in physical contact with one of the physical components. Each transducer converts the electrical signal of one of the synthesizers into vibrations propagated through the physical component in physical contact therewith and refracted by the physical component in the physical space. The simulation environment also comprises a plurality of vibration sensors, each vibration sensor measuring the vibrations propagated in one of the physical components. The simulation environment also comprises a configurator for calibrating the electrical signals generated by the plurality of synthesizers based on a vibration target of a simulation event and the vibrations measured by the vibration sensors.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the generation of vibrations used in a simulation environment.

Throughout the present description, the following expressions are used with relation to the corresponding description:

Transducer: a device which converts an electrical signal into vibrations;

Simulation environment: space in which a simulation is performed, for example a room, a simulator, etc., with physical or virtual boundaries;

Simulated event: an occurrence during a simulation for which production of vibrations refracted in a physical space of the simulation environment and perceived by a user of the simulation environment in the physical space are required to improve realism of the simulation to the user; and Physical component: a physical structure either fixed or movable, which can be made of various types of materials, and is adapted for propagating vibrations.

Generation of Calibrated Vibrations

Figure 1:
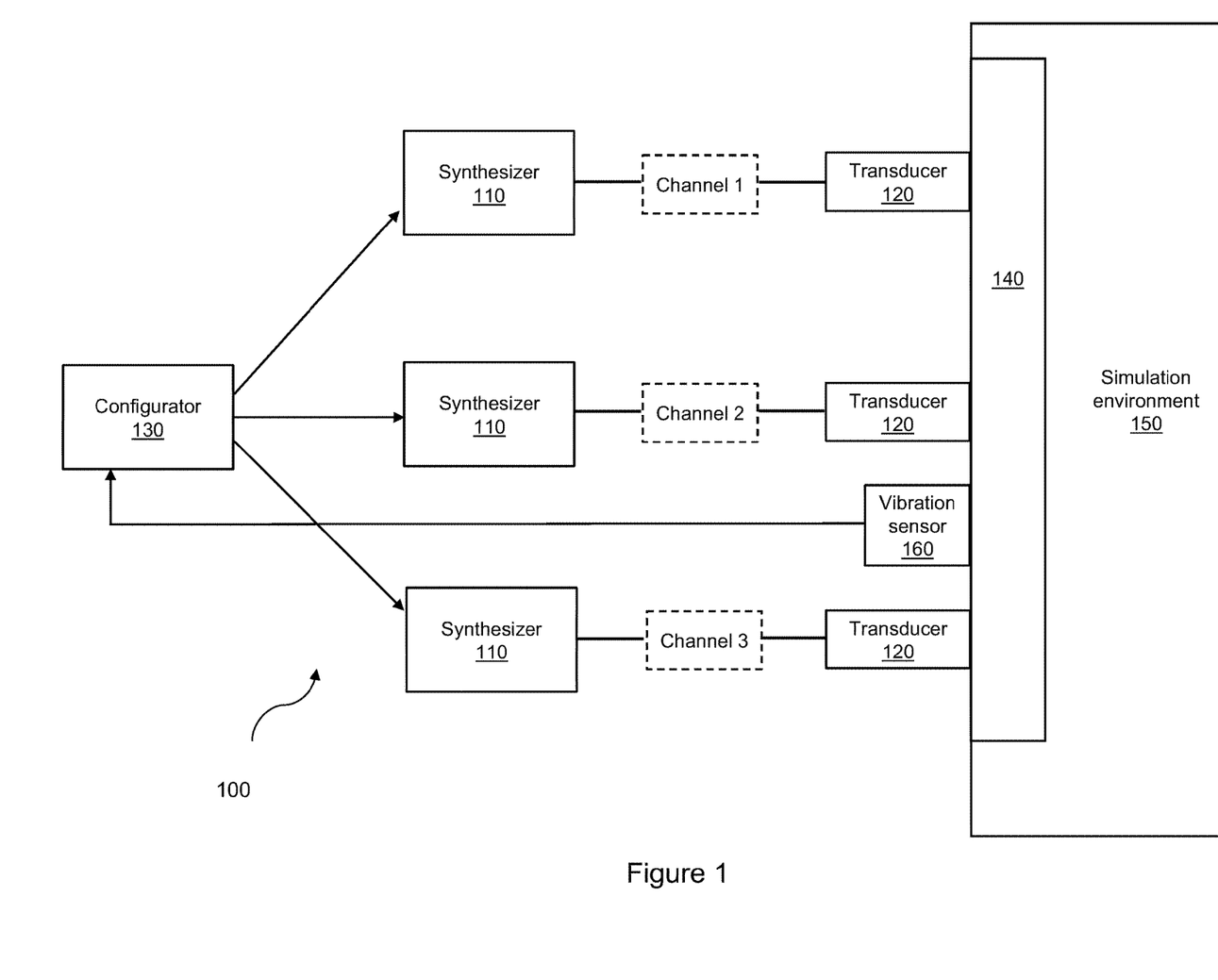
FIG. 1 illustrates a system for calibrating vibrations in a simulation environment.
Figure 2:
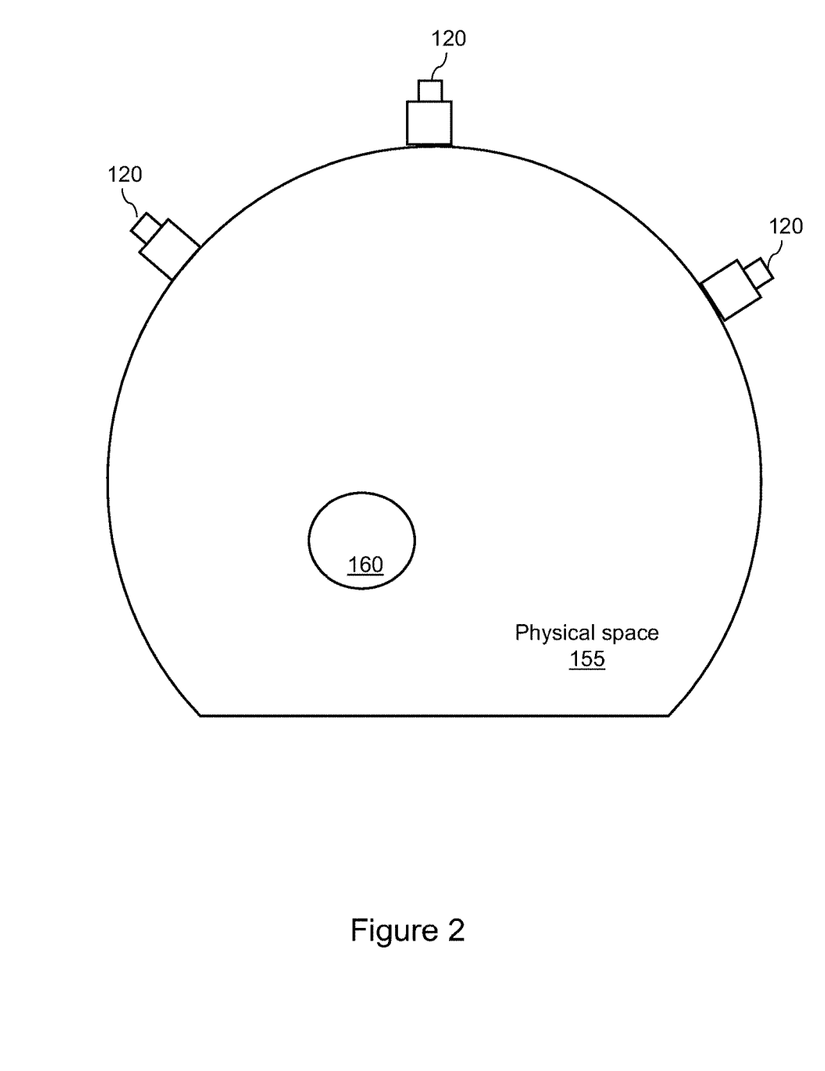
FIG. 2 represents a top sectional view of an exemplary simulation environment.

Referring now to FIGS. 1 and 2, a system 100 for calibrating vibrations in a simulation environment 150 is represented and a simplified exemplary simulation environment 150 depicted. The system 100 allows calibrating of vibrations for simulation environments 150 simulating any type of real-life vehicle, apparatus or environment by replicating physical sensations perceived by a user of the real-life vehicle, apparatus or environment by means of software and various types of hardware. Examples of simulation environments include: a vehicle simulator, a healthcare simulator, a military simulator, an aircraft simulator, a mining simulator, etc.

Components of the simulation environment 150 not related to the present system 100 are not represented for simplification purposes. Position of a user in the physical space 155 of the simulation environment 150 is indicated with reference. The position of the user of the simulation environment 150 in the physical space 155 is not necessarily centralized with respect to the simulation environment 150, as illustrated in FIG. 2.

The system 100 for calibrating vibrations comprises at least one synthesizer 110, at least one transducer 120, a vibration sensor 160 and a configurator 130. The at least one transducer 120 is positioned on or against a physical component 140 of the physical space 155 of the simulation environment 150. The vibration sensor 160 is also positioned against the physical component 140.

For illustrations purposes only, FIG. 1 represents the system 100 with three synthesizers 110 for operating three channels. However, the number of synthesizers 110 (and corresponding channels/transducers 120) may vary from one to many. For simplicity purposes, the following description will describe a system which comprises multiple channels, each channel comprising a pair of synthesizer and transducer, but the present system may include as few as one synthesizer 110 and one transducer 120.

FIGS. 1 and 2 depict three transducers 120 in contact with one physical component 140. However, such a combination of transducers 120 and physical component 140 is for example only. In some implementations, only one transducer 120 may be used for each independent physical component 140, while in other implementations, many transducers 120 may be used concurrently with a single physical component 140.

Each channel comprises a synthesizer 110 which generates an electrical signal, and a transducer 120 which converts the electrical signal generated by the synthesizer 110 into vibrations. The vibrations are propagated through the physical component 140 by the transducer 120 and refracted in the physical space 155 of the simulated environment 150 by the physical component 140. Transducers capable of converting an electrical signal into vibrations are well known in the art. For example, the transducers 120 may be piezoelectric transducers.

The electrical signal generated by the synthesizer 110 is generally an analog electrical signal. Each synthesizer 110 may include a Digital Signal Processor (DSP) for generating or receiving a digital electrical signal, which is converted by a Digital to Analog Converter (DAC) into the analog electrical signal.

The number of transducers 120, and the position of each transducer 120 on one or several physical components 140, varies based on the type of simulation environment 150, shape and size of the physical space 155, types of simulated events and various simulation needs. A larger number of transducers 120 usually allows for a more realistic simulation, while a lower number of transducers 120 is generally more cost effective.

Vibrations propagated 180 through each physical component 140 can be characterized by the following parameters: frequency, amplitude, phase, and delay. Values for the parameters of the propagated vibrations 180 depend on the electrical signal received by the transducer 120, the frequency response of the transducer 120, and the propagation characteristics of the physical component 140 (e.g., permittivity, permeability and conductivity). While propagating through the physical component 140, the propagated vibrations 180 generate refracted vibrations 185 in the physical space 155 of the simulation environment 150. The refracted vibrations 185 depend on the propagated vibrations 180 in the physical component 140, and the propagation characteristics of the physical component 140. Thus, using the same synthesizer 110, generating the same electrical signal received by the same transducer 120, with two different physical components 140 having different propagation characteristics, the propagated vibrations 180 and the refracted vibrations 185 generated inside the physical space 155 of the simulation environment 150 will be different. The propagation characteristics of the physical component 140 thus affect both the propagated vibrations 180 and the refracted vibrations 185.

Figure 3:
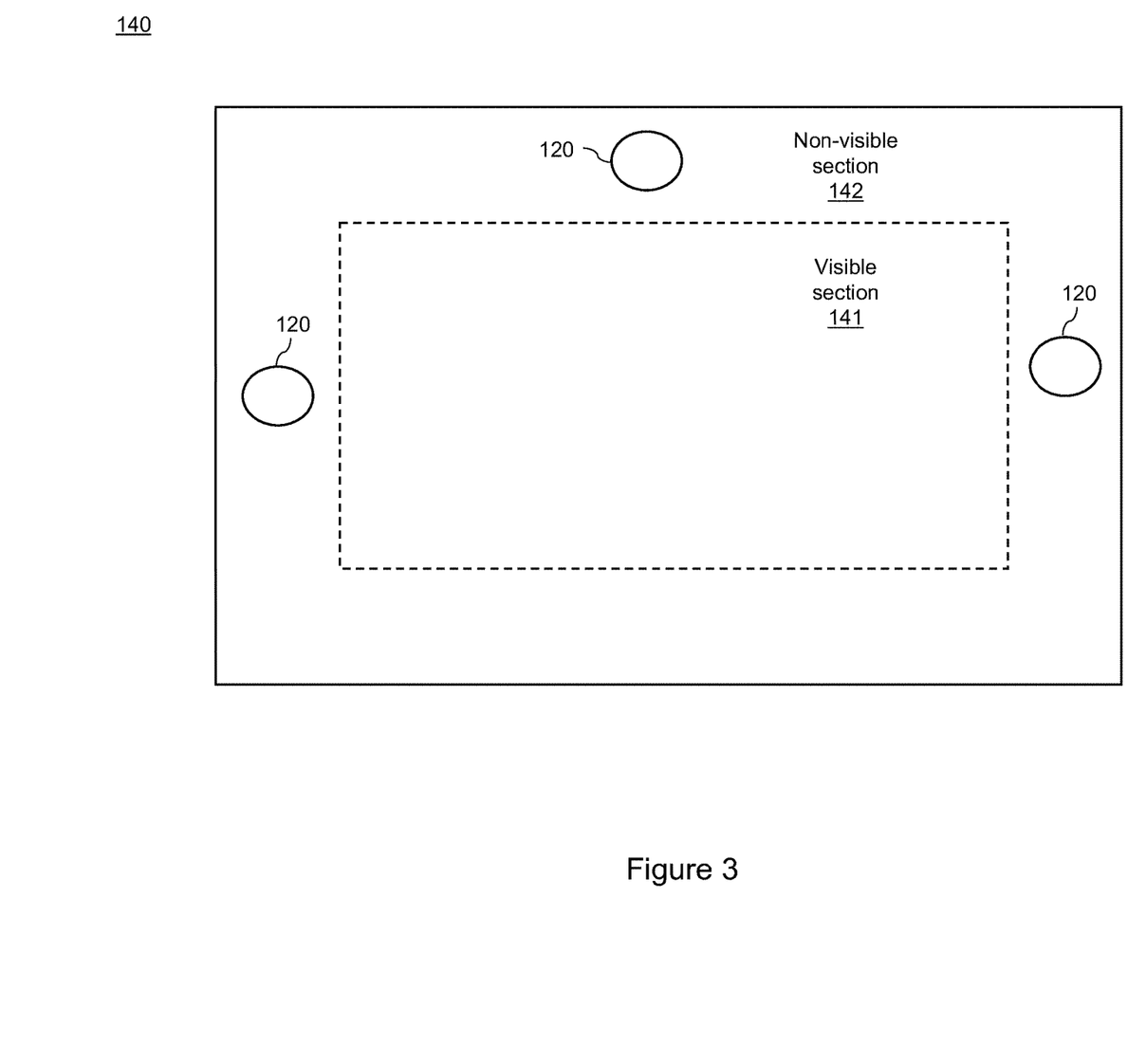
FIG. 3 illustrates an example where the physical component is a simulator cockpit window.

FIG. 3 illustrates an example of physical component 140: a simulator cockpit window. More particularly, FIG. 3 represents a front view of the physical component 140, from outside the physical space 155 of the simulation environment 150. The physical component 140 can be curved, as illustrated in FIG. 2 or flat. On FIG. 3, the plurality of transducers 120 are positioned on a surface of the physical component 140 external to the simulation environment 150, but the transducers 120 could also be positioned on a surface of the physical component 140 internal to the simulation environment 150. Alternately, some of the transducers 120 could be positioned on the surface of the physical component 140 external to the physical space 155 of the simulation environment 150, while other transducers could be positioned on the internal surface of the physical component 140. The physical component 140 shown on FIG. 3 comprises two sections: a visible section 141 which is visible from the inside of the physical space 155 of the simulation environment 150, and a non-visible section 142 not visible from the inside of the physical space 155 of the simulation environment 150. The non-visible section 142 overlaps another physical component 140 of the simulation environment 150 made of a non-transparent material, which hides the non-visible section 142 from the inside of the physical space 155. Alternately, instead of being overlapped with another physical component 140, the non-visible section 142 of the physical component 140 is covered with a material that renders the non-visible section 142 opaque. On the example of FIG. 3, the transducers 120 are positioned on the non-visible section 142, so that the user positioned inside the physical space 155 of the simulation environment 150 and looking at the physical component 140 does not see the transducers 120.

The physical component 140 may have various shapes and thickness; and may be made of various materials including: glass, Plexiglas™, wood, metal, alloy, composite materials, etc.

Figure 4A:
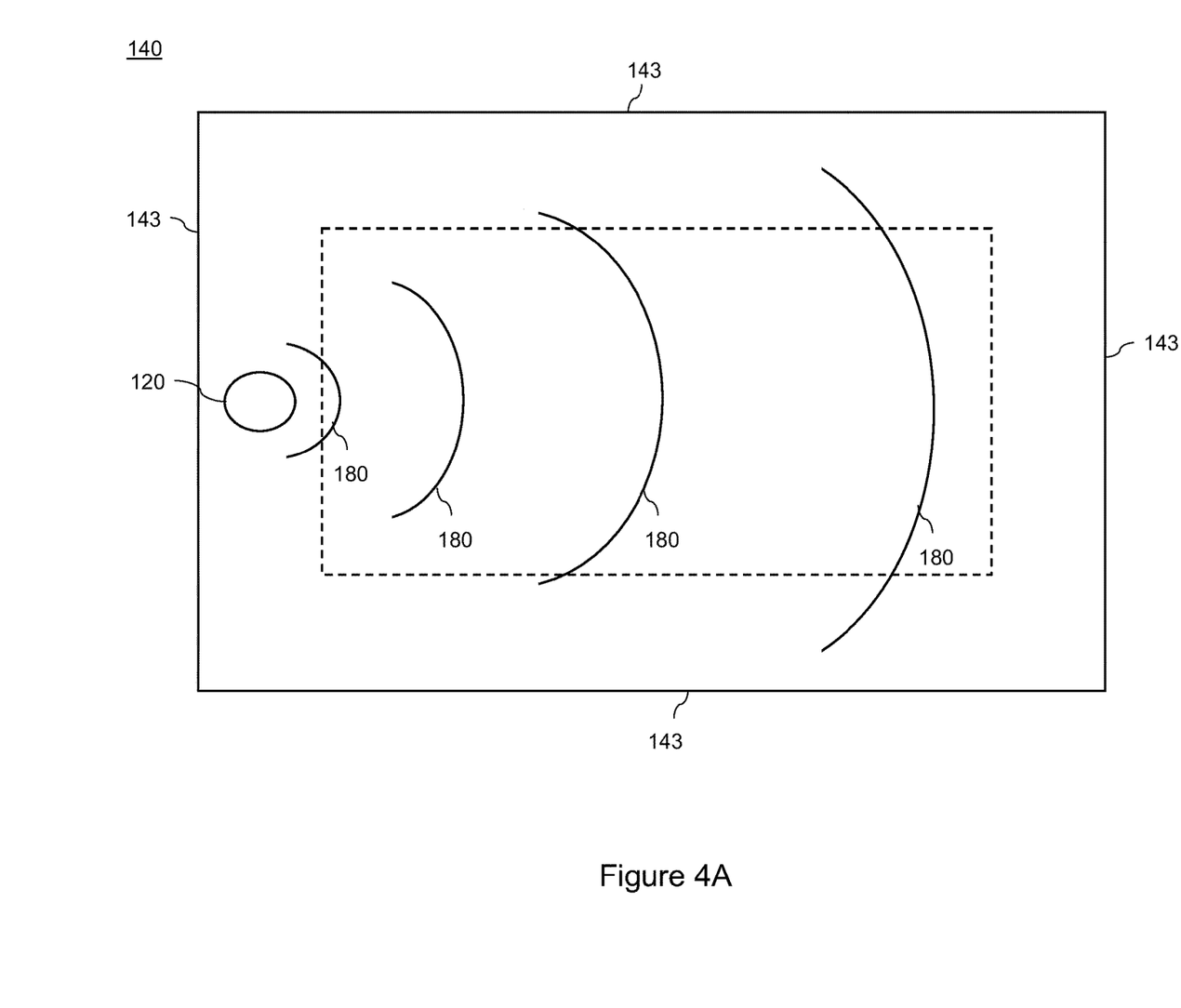
FIG. 4A illustrates vibrations propagated through the physical component.

The vibrations 180 generated by the transducers 120 are propagated through the physical component 140, as represented in FIG. 4A. For simplification purposes, a single transducer 120 is represented in FIG. 4A. The vibrations 180 propagate transversally through the physical component 140. FIG. 4A only represents a portion of the vibrations signals 180 propagating from the left side of the physical component 140 (where the transducer 120 is positioned) towards the right side of the physical component 140. At the extremities 143 of the physical component 140, an isolating material (not represented in FIG. 4A) is used to prevent propagation of the vibrations 180 to adjacent physical component(s). The isolating material may be further adapted to prevent a reflection of the propagated vibrations 180 within the physical component 140, thus preventing reflected vibrations through the physical component 140.

Upon propagation along the physical component, the propagated vibrations 180 are also refracted by the physical component 140 in the physical space 155 of the simulation environment 150. The propagated vibrations 180 and the refracted vibrations 185 simulate vibrations that would be perceived by a user of the real-life vehicle, apparatus or environment represented by the simulation environment 150. For example, in the case of a simulation environment 150 corresponding to an aircraft, the propagated vibrations 180 and the refracted vibrations 185 correspond to at least one of the following types of simulated events: simulated air impact vibrations, simulated rain impact vibrations, simulated hail impact vibrations, simulated pressurization vibrations, etc.

The propagated vibrations 180 induce a deformation of the physical component 140. Usually, the deformation of the physical component 140 cannot be seen by a human, unless the propagated vibrations 180 are particularly strong.

Figure 4B:
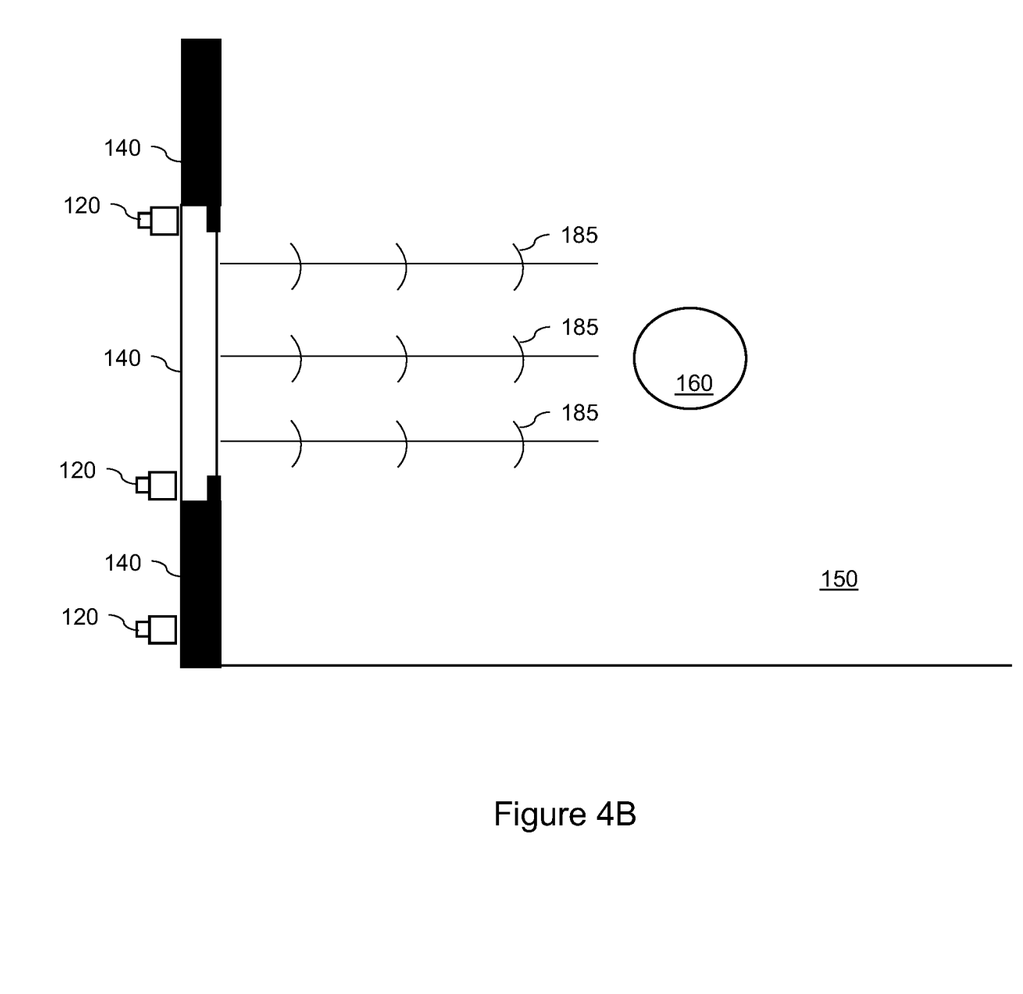
FIGS. 4B and 4C illustrate vibrations refracted in the simulation environment.

FIG. 4B represents a simplified vertical sectional view of the simulation environment 150. The refracted vibrations 185 generated by the deformation of the physical component 140 propagate inside the physical space 155 of the simulation environment 150, and reach the user of the simulation environment 150 located at position 170. Although not shown on FIG. 4B for simplicity purposes, the simulation environment 150 may include other physical components that generate vibrations, such as for example a pilot chair, a cockpit, a stick, hydraulic or pneumatic legs, etc.

Figure 4C:
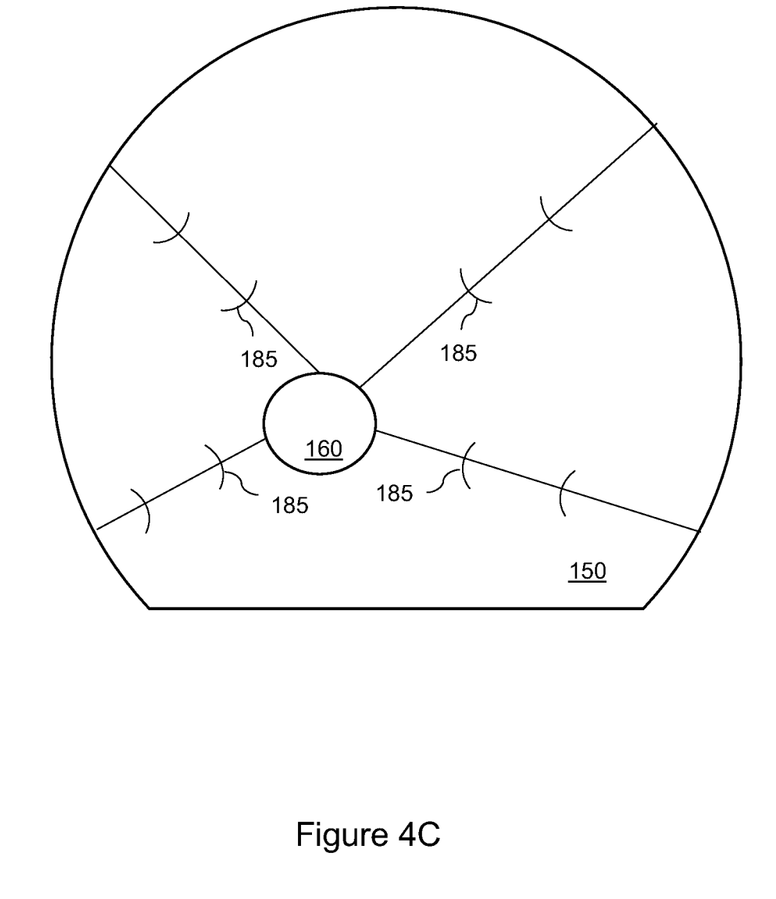

FIG. 4C represents the exemplary fronts for refracted vibrations 185 travelling in the physical space 155 of the simulation environment 150 of FIG. 2. The refracted vibrations 185 generated by the deformation of the physical components 140 propagate within the simulation environment 150, and reach the user of the simulation environment 150 located at position 170. As can be seen from FIG. 4C, the user may receive several fronts of refracted vibrations 185, from various physical components 140. Without proper calibration, the cumulative effect of those refracted vibrations 185 may be distracting or worse yet disruptive for the user, instead of contributing to perceived realism of the simulation.

The usual way to adjust the electrical signals generated by the synthesizers 110 is to adjust the synthesizers 110 individually and manually, without using a configurator 130. The adjustments consist in adapting the generated electrical signals to obtain acceptable perceived vibrations in the simulation environment 150, rather than optimal perceived vibrations as a function of simulated events. In addition to being subjective and costly, this method cannot ensure improved realism for each simulated event.

To overcome the drawbacks of prior art systems, the present system 100 comprises the configurator 130 and the vibration sensor 160. For simplicity purposes, the following description and Figures depict a system 100 and simulation environment 150 which comprises only one vibration sensor 160. However, the present system 100 and simulation environment 150 are not limited to such an implementation, and several vibration sensors 160 could be used concurrently with one configurator 130, where each vibration sensor 160 is in physical contact with one of the physical component 140 for measuring vibrations propagated 180 therein. The vibration sensor 160 is positioned against the physical component 140 to be in physical contact therewith, and collects therefrom data about the vibrations propagated 180 there through. For example, one vibration sensor 160 may be affixed against each physical component 140 in which vibration is propagated. Alternatively, the vibration sensors 160 may be affixed only to the physical components 140 which propagate vibrations for the same event concurrently. The vibration sensor 160 measure the propagated vibrations 180 in the physical component 140.

Figure 5:
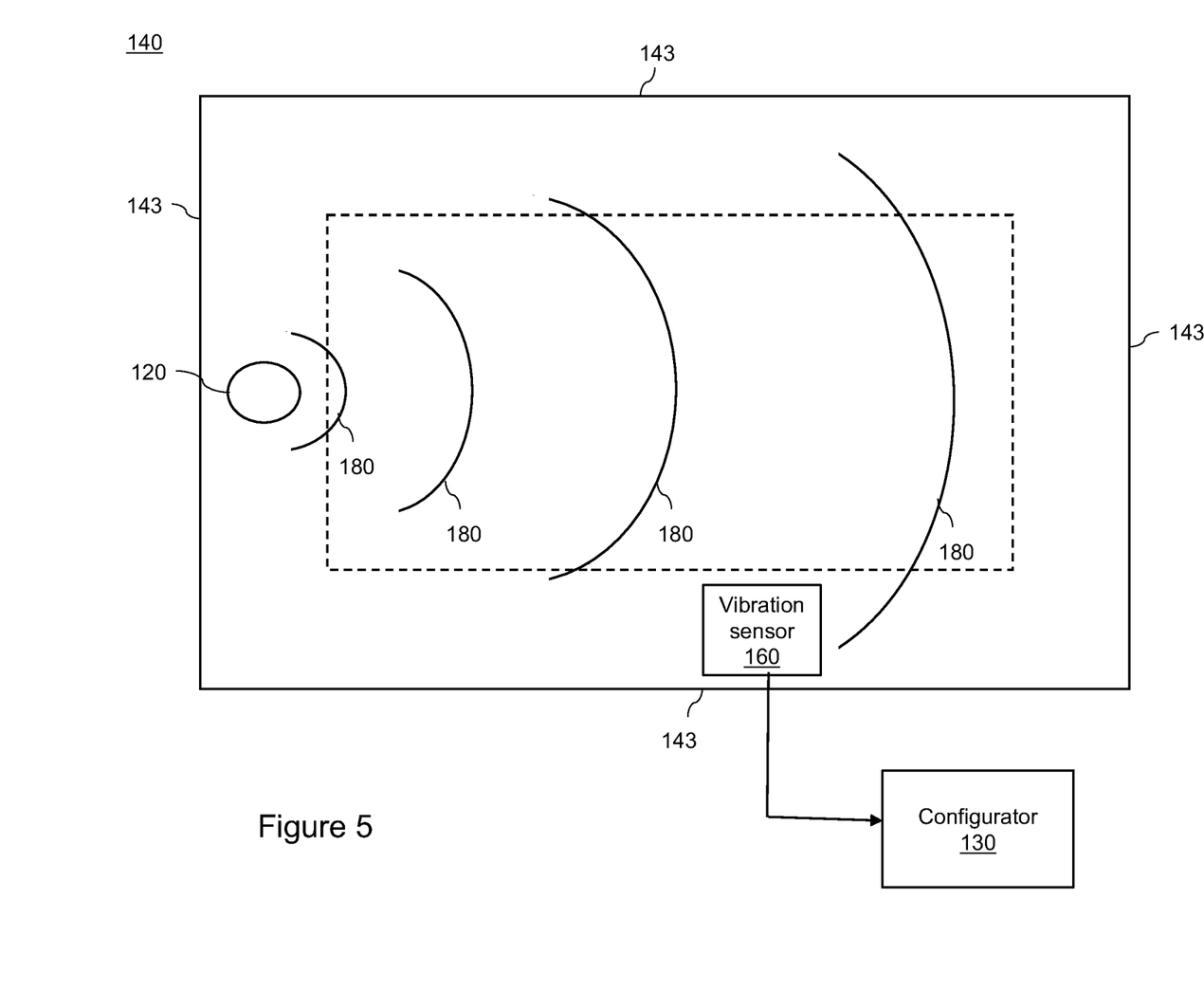
FIG. 5 illustrates an exemplary physical component with a vibration sensor.
Figure 6:
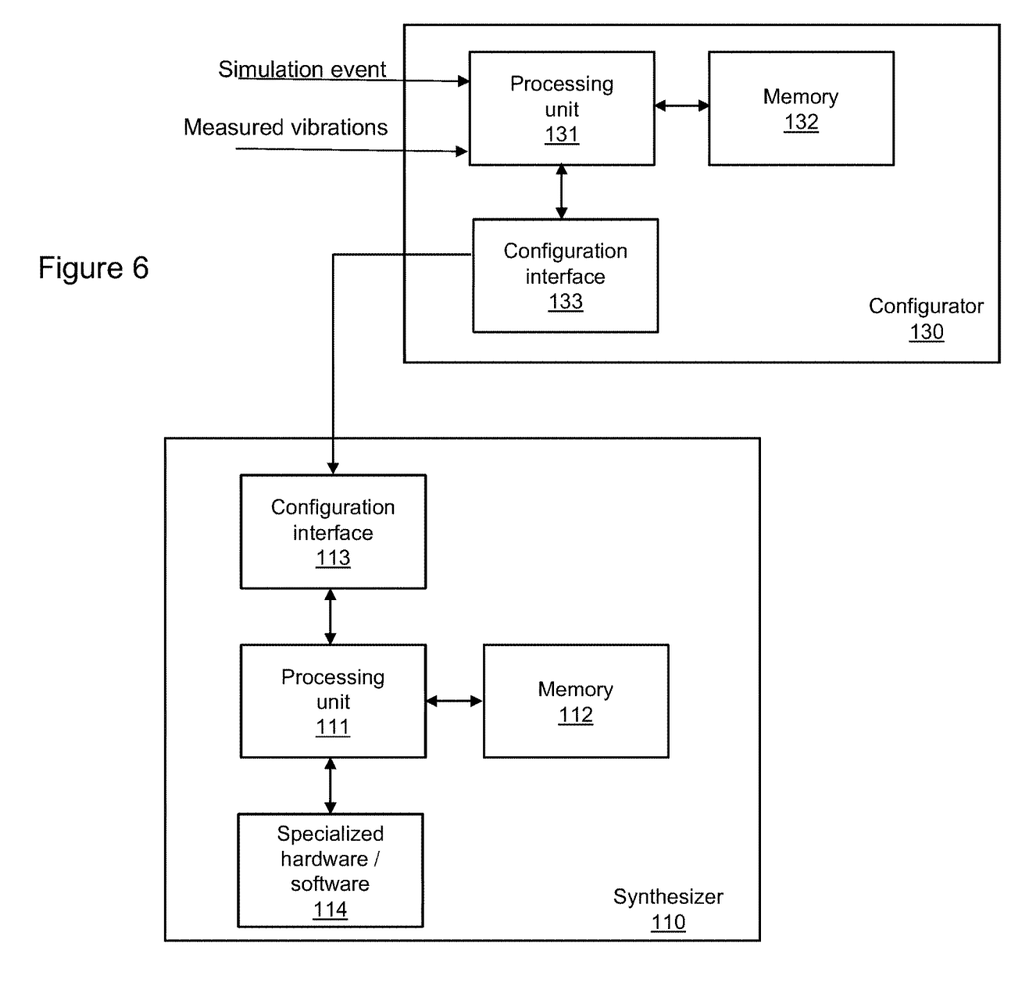
FIG. 6 is a schematic representation of several components of the system of FIG. 1.

Reference is now made to FIG. 6, which depicts components of the configurator 130 and the synthesizer 110. The configurator 130 comprises a processing unit 131, having one or more processors (not represented in FIG. 5 for simplification purposes) capable of executing instructions of computer program(s) (e.g., a configuration algorithm). Each processor may further have one or several cores.

The configurator 130 also comprises memory 132 for storing instructions of the computer program(s) executed by the processing unit 131, data generated by the execution of the computer program(s), data received via a configuration interface 133 of the configurator 130, etc. The configurator 130 may comprise several types of memories, including volatile memory, non-volatile memory, etc.

The configurator 130 further comprises the configuration interface 133. For instance, the configuration interface 133 comprises a communication interface (e.g., a Wi-Fi interface, an Ethernet interface, a cellular interface, a combination thereof, etc.) for exchanging data with other entities (such as the synthesizer 110, a remote computing entity, etc.) over a communication network. The configuration interface 133 may also comprise a user interface (e.g., a mouse, a keyboard, a trackpad, a touchscreen, etc.) for allowing a user to interact with the configurator 130.

Optionally, the configurator 130 further comprises a display (e.g., a regular screen or a tactile screen) for displaying data generated by the processing unit 131.

The configurator 130 may be implemented by a standard desktop or laptop computer, or by a dedicated computing device having adapted computing capabilities and performances.

The synthesizer 110 comprises a processing unit 111, having one or more processors (not represented in FIG. 8 for simplification purposes) capable of executing instructions of computer program(s) (e.g., a configuration algorithm). Each processor may further have one or several cores.

The synthesizer 110 also comprises memory 112 for storing instructions of the computer program(s) executed by the processing unit 111, data generated by the execution of the computer program(s), data received via a configuration interface 113 of the synthesizer 110, etc. The synthesizer 110 may comprise several types of memories, including volatile memory, non-volatile memory, etc.

The synthesizer 110 further comprises the configuration interface 113. For instance, the configuration interface 113 comprises a communication interface (e.g., a Wi-Fi interface, an Ethernet interface, a cellular interface, a combination thereof, etc.) for exchanging data with other entities (such as the configurator 130, a remote computing entity, etc.) over a communication network.

The synthesizer 110 also comprises specialized hardware and/or specialized software 114 for performing the generation of the electrical signals generated by the synthesizer 110. For instance, as mentioned previously, the specialized hardware 114 includes a DSP for generating digital electrical signals, and a DAC for transforming the digital electrical signals into analog electrical signals transmitted to the corresponding transducer (not represented in FIG. 8).

Examples of data received via the configuration interface 133 of the configurator 130, include: the vibrations target per simulated event, the frequency response of the physical component 140, etc.

Figure 7:
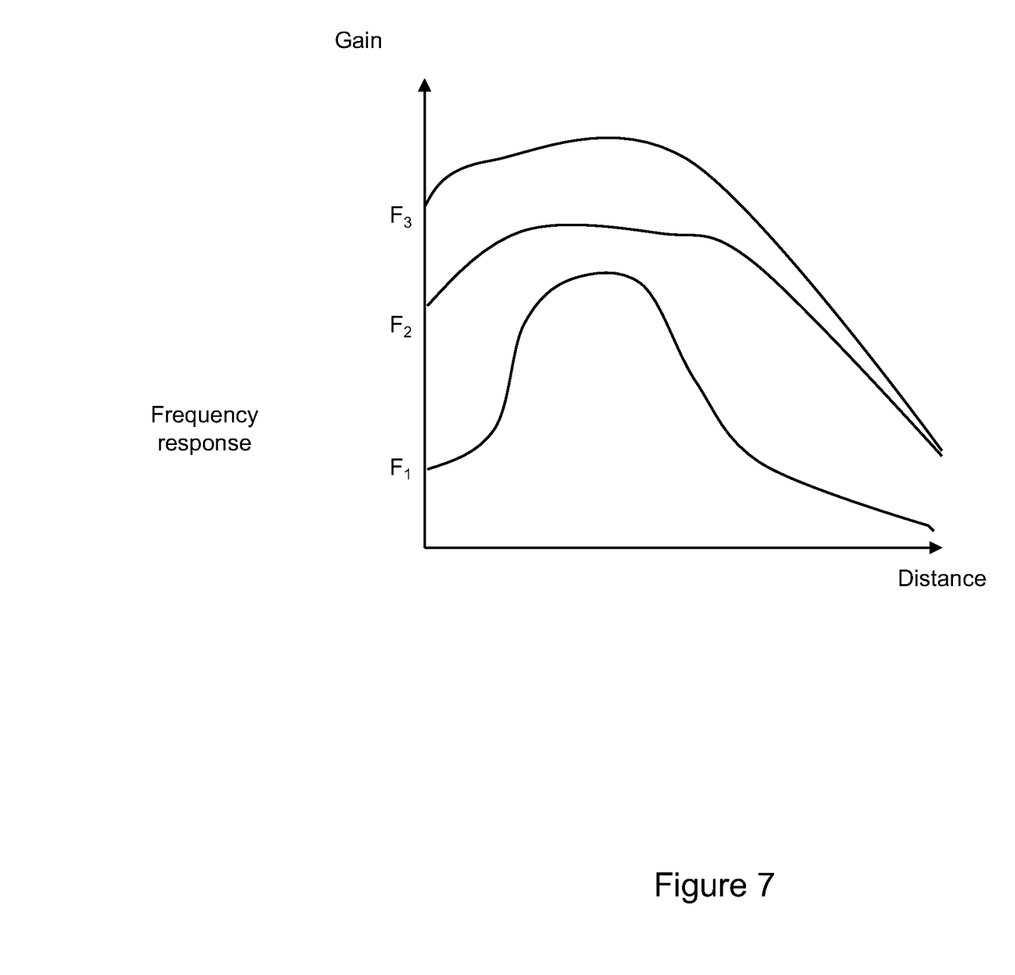
FIG. 7 illustrates exemplary frequency responses of a physical component.
Figure 8:
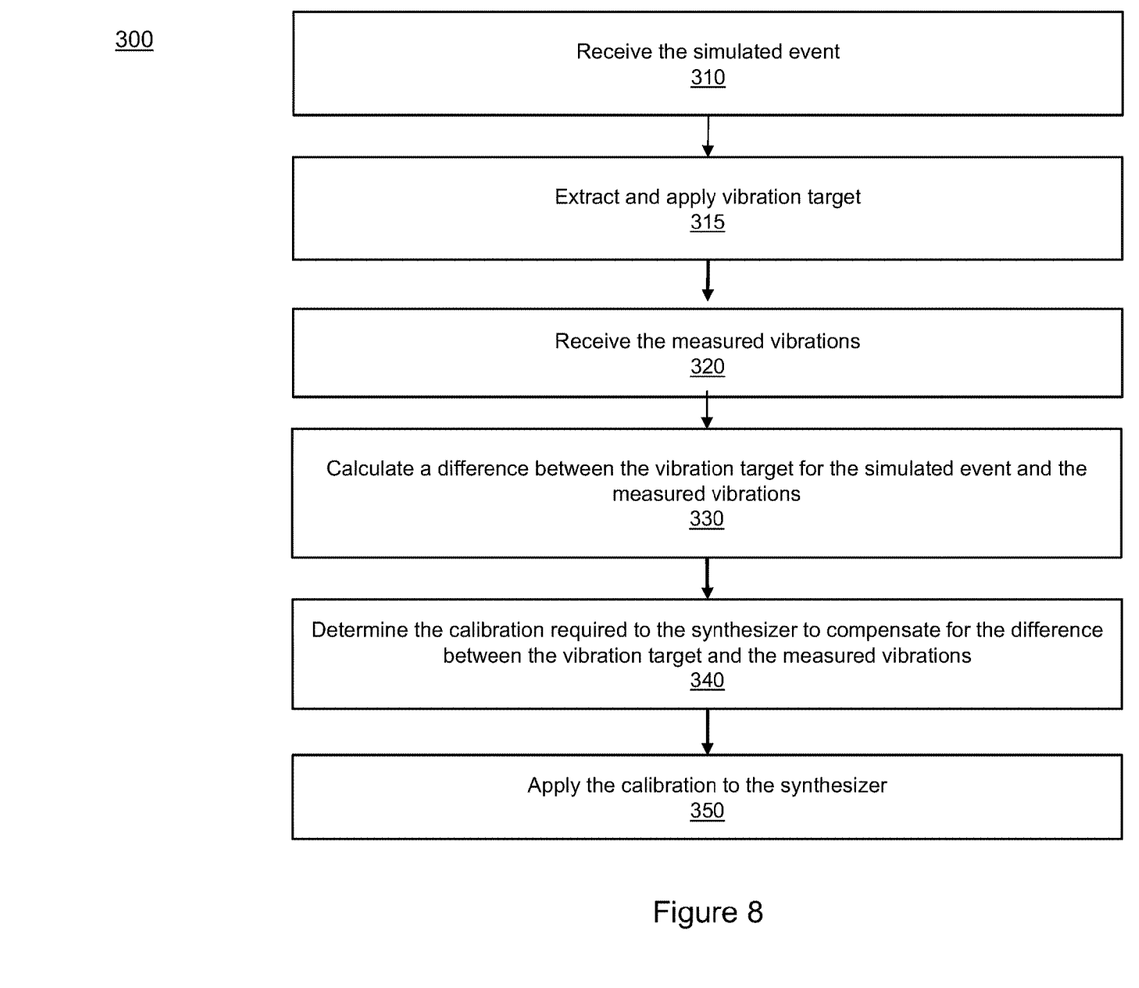
FIG. 8 illustrates an algorithm implemented by a configurator.

Reference is now made concurrently to FIGS. 1-8, where FIG. 7 is an exemplary graph of frequency responses of a physical component 140, and FIG. 8 is an exemplary method of calibration of vibrations.

The processing unit 131 of the configurator 130 receives (step 310) from the simulation environment 150 an indicator of the simulation event being simulated. The processing unit 131 of the configurator 130 extracts (step 315) from the memory 132 the vibration target for the received simulation event and calculates corresponding vibration parameters for each synthesizer 110. For example, vibration targets for each type of simulated event may be stored in the memory 132 of the configurator 130 and extracted for application by the synthesizers 110. The vibration target defines the following: frequency, amplitude, phase, and delay for the propagated vibrations 180.

As the distance between the user of the simulation environment 150 and the physical components 140 may vary, the configurator 130 assesses the relative position of the user in the physical space 155 either by means of a detector, a camera, or by a position of a seat for receiving the user of the simulation environment 150. The processing unit 131 of the configurator 130 thus adjusts the frequency, amplitude, phase and delay of the electric signal generated by each synthesizer 110 involved in simulating the event, based on the relative position of the user in the physical space 155 of the simulation environment. The processing unit 131 of the configurator 130 further controls the electric signal generated by each synthesizer 110 as a function of the vibration parameters of the vibration target for the simulated event, so that a sum of the refracted vibrations perceived by a user at the position 170 corresponds to the vibration target for the simulated event. Considering the position of the physical components 140 refracting the vibrations in the physical space 155, and their cumulative effect at the position 170, greatly improves realism.

The processing unit 131 of the configurator 130 then receives (step 320) from the vibration sensor(s) 160 the measured propagated vibrations 180 in the physical components 140.

The processing unit 131 of the configurator 130 calculates (step 330) a difference between the measured vibrations received from the vibration sensors 160 and the vibration target for the simulated event. Additional parameters may be used to calculate the required calibration to be applied at the synthesizer 110, such as for example propagation characteristics of the physical components 140 on which the transducer(s) 120 is/are physically in contact with, frequency response of the transducer(s) 120, relative position of the physical components 140 with respect to the position 170 of the user, etc.

Then the processing unit 131 of the configurator 130 determines (step 340) based on the calculated difference of step 330 the calibration required at the synthesizers 110. The calibration may impact any of the following parameters of the electrical signal generated by the synthesizer: frequency, amplitude, phase and delay. The processing unit 131 communicates to each synthesizer 110 the calibration through the configuration interface 133. The configuration interface 133 of the configurator 130 communicates the calibration to a configuration interface 113 of each synthesizer.

The synthesizers 110 receive through the configuration interface 113 the calibration to be applied. The received calibration is transferred to a processing unit 111, which stores the received calibration. The specialized hardware/software 114 of the synthesizer applies (step 350) the calibration, and the synthesizer thereafter generates a calibrated electrical signal which is converted by the transducer 120 of the corresponding channel.

Based on the simulation event, the configurator 130 may configure a single synthesizer 110, some of the synthesizers 110, or all the synthesizers 110.

For a given simulation event (e.g., simulation of air impact vibrations, simulation of rain impact vibrations, simulation of hail impact vibrations, simulation of pressurization vibration, etc.), only a subset of the available synthesizers 110 may be used. The configurator 130 determines which synthesizers 110 are used for generating vibrations for the simulated event. For each channel configured by the configurator 130, the configurator 130 configures the corresponding synthesizer 110 to generate the calibrated electric signals, thereby generating calibrated propagated vibrations 180.

The aforementioned parameters (vibrations target, frequency response of the physical component 140, frequency response of the transducer 120, relative position 170 of the user in the physical space 155 of the simulation environment 150) may be used separately or concurrently for determining the calibrated electrical signal generated by the synthesizer 110 for the simulated event.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A system for calibrating vibrations in a simulation environment, the system comprising:
   a synthesizer for generating an electrical signal;
   a transducer in physical contact with a physical component of the simulation environment, the transducer for converting the electrical signal into vibrations propagated through the physical component and into a physical space of the simulation environment;
   a vibration sensor for measuring the vibrations propagated through the physical component; and
   a configurator for calibrating the electrical signal generated by the synthesizer, the configurator for calibrating the electrical signal generated by the synthesizer based on a vibration target of a simulated event and the vibrations measured by the vibration sensor.

2. The system of claim 1, wherein the configurator is configured for calibrating the electrical signal generated by the synthesizer further based on at least one of the following: a frequency response of the transducer and propagation characteristics of the physical component.

3. The system of claim 2, wherein the transducer is positioned on an exterior surface of the physical component and not visible to a user positioned inside the simulation environment.

4. The system of claim 3, wherein the simulated event corresponds to one of the following: simulated air impact vibrations, simulated rain impact vibrations, simulated hail impact vibrations, and simulated pressurization vibrations.

5. A simulation environment with vibrations calibrating functionality, the simulation environment comprising:
   a plurality of physical components defining a physical space;

a plurality of synthesizers, each synthesizer corresponding to an independent channel and being configured for generating a respective electrical signal;

a plurality of transducers, each transducer being in physical contact with a given one of the physical components, each transducer being configured for converting the respective electrical signal of one of the synthesizers into vibrations propagated through the given one of the physical components in physical contact therewith and into the physical space;

a plurality of vibration sensors, each vibration sensor being configured for measuring the vibrations propagated through a respective one of the physical components; and a configurator for calibrating the respective electrical signals generated by the plurality of synthesizers based on a vibration target of a simulation event and the propagated vibrations measured by the vibration sensors.

6. The simulation environment of claim 5, wherein the configurator is configured for calibrating the respective electrical signals generated by the plurality of synthesizers further based on at least one of the following: a frequency response of the transducers and propagation characteristics of the physical components in physical contact with the transducers.

7. The simulation environment of claim 6, wherein the simulation environment corresponds to an aircraft simulator.

8. The simulation environment of claim 7, wherein the physical space corresponds to a cockpit of the aircraft simulator and a particular one of the physical components is a simulator cockpit window, and one of the plurality of transducers is positioned on a non-visible section of the simulator cockpit window.

9. The simulation environment of claim 8, wherein the propagated vibrations correspond to one of the following simulated events: simulated air impact vibrations, simulated rain impact vibrations, simulated hail impact vibrations, and simulated pressurization vibrations.

10. The simulation environment of claim 5, further comprising:

a vibration sensor affixed to the given one of the physical component for measuring the vibration propagated through the given one of the physical components and communicating the measured vibrations propagated to the configurator;

the configurator being configured for calibrating the respective electrical signals generated by the plurality of synthesizers based on the measured vibrations propagated.

11. The simulation environment of claim 5, further comprising:

a plurality of vibration sensors, each one of the plurality of vibration sensors being affixed to a respective one of the physical components for measuring respective vibrations propagated by the physical component and communicating the measured respective vibrations to the configurator, the configurator being configured for calibrating the electrical signals generated by each synthesizer based on the measured respective vibrations propagated through the physical component corresponding to the synthesizer.

12. A computer program product for calibrating vibrations in a simulation environment, the simulation environment comprising a synthesizer for generating an electrical signal, a transducer in physical contact with a physical component of the simulation environment for converting the electrical signal into vibrations propagated through the physical component and into a physical space of the simulation environment, and a vibration sensor for measuring the vibrations propagated through the physical component, the computer program product comprising a computer readable memory storing computer executable instructions thereon that when executed by a computer perform the method step of:

calibrating the electrical signal generated by the synthesizer based on a vibration target of a simulated event and the vibrations measured by the vibration sensor.

13. The computer program product of claim 12, wherein said calibrating the electrical signal generated by the synthesizer is performed further based on at least one of the following: a frequency response of the transducer and propagation characteristics of the physical component.

14. The computer program product of claim 12, wherein the simulated event corresponds to one of the following: simulated air impact vibrations, simulated rain impact vibrations, simulated hail impact vibrations, and simulated pressurization vibrations.

* * * * *